United States Patent
Roziere

(10) Patent No.: US 10,860,137 B2
(45) Date of Patent: Dec. 8, 2020

(54) CONTROL INTERFACE DEVICE AND FINGERPRINT SENSOR

(71) Applicant: QUICKSTEP TECHNOLOGIES LLC, Wilmington, DE (US)

(72) Inventor: Didier Roziere, Nimes (FR)

(73) Assignee: QuickStep Technologies LLC, Wilmington, DE (US)

( * ) Notice: Subject to any disclaimer, the term of this patent is extended or adjusted under 35 U.S.C. 154(b) by 0 days.

(21) Appl. No.: 15/507,756

(22) PCT Filed: Aug. 12, 2015

(86) PCT No.: PCT/EP2015/068521
§ 371 (c)(1),
(2) Date: Feb. 28, 2017

(87) PCT Pub. No.: WO2016/034380
PCT Pub. Date: Mar. 10, 2016

(65) Prior Publication Data
US 2017/0285869 A1    Oct. 5, 2017

(30) Foreign Application Priority Data
Sep. 5, 2014 (FR) ..................... 14 58357

(51) Int. Cl.
*G06F 3/041* (2006.01)
*G06K 9/00* (2006.01)
*G06F 3/044* (2006.01)

(52) U.S. Cl.
CPC ............ *G06F 3/0418* (2013.01); *G06F 3/044* (2013.01); *G06K 9/0002* (2013.01); *G06F 2203/04107* (2013.01)

(58) Field of Classification Search
CPC .......... G06F 3/044; G06F 2203/04107; G06F 3/0418; G06K 9/0002
See application file for complete search history.

(56) References Cited

U.S. PATENT DOCUMENTS 5,483,261 A    1/1996  Yasutake
5,488,204 A    1/1996  Mead et al.
(Continued)

FOREIGN PATENT DOCUMENTS

EP    2 267 791 A2    10/2010
FR    2 756 048 A1    5/1998
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Bryan Earles
(74) *Attorney, Agent, or Firm* — Kubota & Basol LLP

(57) ABSTRACT

The present invention relates to a device or apparatus comprising a touch surface provided with first capacitive measurement electrodes (21), a fingerprint sensor (14) provided with second capacitive measurement electrodes (22) distinct from the first electrodes (21), capacitive electronic detection means (20) arranged so as to allow the detection of control objects (11) in a neighborhood of the first electrodes (21) by measuring a capacitive coupling between said first measurement electrodes (21) and said control objects (11) wherein said capacitive electronic detection means (20) comprise inputs electrically connected simultaneously to at least one first measurement electrode (21) and at least one second measurement electrode (22).

19 Claims, 3 Drawing Sheets

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,844,506 A | 12/1998 | Binstead | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,847,354 B2 | 1/2005 | Vranish | |
| 7,015,894 B2 | 3/2006 | Morohoshi | |
| 7,184,064 B2 | 2/2007 | Zimmerman et al. | |
| 7,570,064 B2 | 8/2009 | Roziere | |
| 7,663,607 B2 | 2/2010 | Hotelling et al. | |
| 8,149,002 B2 | 4/2012 | Ossart et al. | |
| 8,159,213 B2 | 4/2012 | Roziere | |
| 8,479,122 B2 | 7/2013 | Hotelling et al. | |
| 8,770,033 B2 | 7/2014 | Roziere | |
| 8,917,256 B2 | 12/2014 | Roziere | |
| 9,035,903 B2 | 5/2015 | Binstead | |
| 9,268,431 B2 * | 2/2016 | King | G06F 3/0416 |
| 9,933,879 B2 * | 4/2018 | Yao | G06F 3/0416 |
| 9,954,858 B2 * | 4/2018 | Lee | G06K 9/00006 |
| 10,001,877 B2 * | 6/2018 | Noto | G06F 1/3262 |
| 2006/0097733 A1 | 5/2006 | Roziere | |
| 2006/0197753 A1 | 9/2006 | Hotelling | |
| 2008/0231292 A1 * | 9/2008 | Ossart | G01B 7/08 324/688 |
| 2008/0284261 A1 | 11/2008 | Andrieux et al. | |
| 2009/0309851 A1 * | 12/2009 | Bernstein | G06F 3/0416 345/174 |
| 2010/0052700 A1 | 3/2010 | Yano et al. | |
| 2011/0007021 A1 * | 1/2011 | Bernstein | G06F 3/0416 345/174 |
| 2011/0102567 A1 | 5/2011 | Erhart | |
| 2011/0169783 A1 | 7/2011 | Wang et al. | |
| 2012/0044662 A1 | 2/2012 | Kim et al. | |
| 2012/0050195 A1 | 3/2012 | Heo et al. | |
| 2012/0182253 A1 * | 7/2012 | Brosnan | G06F 3/0416 345/174 |
| 2012/0187965 A1 | 7/2012 | Roziere | |
| 2012/0188200 A1 | 7/2012 | Roziere | |
| 2013/0135247 A1 * | 5/2013 | Na | G06F 21/32 345/174 |
| 2013/0307776 A1 | 11/2013 | Roziere | |
| 2014/0132335 A1 | 5/2014 | Rauhala et al. | |
| 2014/0145997 A1 * | 5/2014 | Tiruvuru | G06F 3/044 345/174 |
| 2014/0210776 A1 | 7/2014 | Kuroiwa et al. | |
| 2014/0241595 A1 | 8/2014 | Bernstein et al. | |
| 2015/0035792 A1 | 2/2015 | Roziere et al. | |
| 2015/0054764 A1 * | 2/2015 | Kim | G06K 9/00013 345/173 |
| 2015/0177884 A1 * | 6/2015 | Han | G06F 3/044 345/174 |
| 2015/0370364 A1 * | 12/2015 | Jordan | G06F 3/044 345/174 |
| 2016/0117017 A1 * | 4/2016 | Kremin | G01R 27/2605 345/174 |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

CONTROL INTERFACE DEVICE AND FINGERPRINT SENSOR

CROSS-REFERENCE TO RELATED APPLICATIONS

This application is a National Phase Patent Application under 35 U.S.C. § 371 of International Application No. PCT/EP2015/068521, filed Aug. 12, 2015, which claims priority to French Patent Application No. 1458357, filed on Sep. 5, 2014, which are incorporated herein by reference in their entireties.

TECHNICAL DOMAIN

This invention relates to a tactile interface and fingerprint reader device. It also relates to an apparatus comprising such a device.

The domain of the invention is more specifically, but without limitation, that of human-machine interface devices.

STATE OF THE PRIOR ART

More and more portable apparatuses, in particular of smart phone or tablet type, are equipped with a security device using a fingerprint reader.

This fingerprint reader is used in order to identify the user, for example to authorize unlocking the apparatus or execution of another function.

The most widespread technologies for implementing fingerprint readers use capacitive measurement. These technologies have the advantage of being discreet, non-bulky, and energy-efficient and provide a good level of reliability.

There are two main families of capacitive sensors used for reading fingerprints:
  Matrix sensors or called "total pixel matrix sensors" which comprise a matrix of capacitive measurement electrodes (corresponding to pixels) distributed on a surface. These sensors require a relatively large surface area, of order 1 to 2 $cm^2$ and a very large number of pixels (electrodes);
  Linear sensors or called "reduced matrix sensors" which comprise one or more rows of capacitive measurement electrodes (corresponding to pixels).

The matrix sensors are more sophisticated but more robust because a simple press of the finger is sufficient to measure an image of the fingerprint. In general, the capacitive measurement electrodes are deposited directly on a surface of an integrated circuit of the apparatus.

In terms of integration cost, the linear sensors are more economical, but they require a more complex management to reconstitute the image of the fingerprint. In fact, to acquire a complete image the finger has to be slid over the sensor. In general, a few additional sensors are used to estimate the position and movement of the finger in order to reconstitute the image of the fingerprint. An economical solution for implementation thereof consists of depositing the electrodes on a printed circuit. The sensor can in that way be displaced from the measurement integrated circuit. The printed circuit can be flexible (for example polyimide).

The resolution needed to measure fingerprints is about 500 dpi (dots or pixels per inch). For a row of electrodes, about 200 electrodes, corresponding to 200 image pixels, need to be implemented. The size of these capacitive measurement electrodes therefore needs to be about a few tens of microns on a side.

The measurement principle generally used in known fingerprint sensors is based on the measurement of disruptions of coupling capacitances between emitting and receiving electrodes. This measurement mode is designated by the name: mutual capacitance measurement or "mutual" mode.

In linear fingerprint sensors, the receiving electrodes are distributed in a row. An emitting trace is placed near these receiving electrodes so as to run along them. The receiving electrodes are connected to charge amplifiers.

A coupling capacitance referred to as "mutual" is created between each receiving electrode and the emitting trace. When a finger is placed near the sensor (at a distance extremely close to the electrodes), the mutual capacitances (meaning the coupling between the emitting electrode and the receiving electrodes) are changed. These capacitances are more or less changed depending on the distance which locally separates the sensor from the finger, meaning depending on the relief of the skin of the finger.

The coupling capacitance measurement technique is also frequently used in touchpads for control interfaces in smart phone or tablet type portable devices, for example.

Sharing electrodes and/or electronic detection elements between the touchpad and the fingerprint sensor is known, in particular in order to limit the bulk and electric consumption.

In particular, the document US 2013/0135247, by NA et al. is known; it describes an apparatus provided with a touch interface based on a coupling capacitance measurement which includes some areas with a greater density of tracks which implement a fingerprint sensor incorporated into the touchpad.

This type of embodiment however has disadvantages.

Because of the size difference of the electrodes between the fingerprint sensor and the remainder of the touchpad, measured capacitance variations near the fingerprint sensor are 10 to 100 times smaller than for the actual touch interface. This causes sensitivity and dynamic problems for the detection electronics.

Also, in so far as all the electrodes are implemented in the same layer of the touchpad under the protective glass, the fingerprint sensor electrodes are too far away from the finger, which additionally generates sensitivity problems and a phenomenon of spatial skewing or averaging of the relief of the fingerprints which degrades the measurement.

Touchpads are also known which implement a capacitance measurement principle referred to as "self" by directly measuring the capacitance created between the electrodes and the objects (fingers).

With these touchpads, an object such as a finger can be detected more than 1 cm away from the sensitive surface. The capacitances are very small and of the same order of magnitude as the capacitances measured by the fingerprint capacitive sensors. Very high sensitivity detection electronics are therefore required.

The French patent 2 756 048, by the applicant, is in particular known; the document describes capacitive detection electronics referred to as "floating bridge" with a sensitive part referenced to a floating reference potential with which optimal detection performance can be obtained.

In this measurement mode, the touchpad can comprise individual measurement electrodes distributed over the surface thereof according to a matrix arrangement. The number of electrodes is then fairly high, for example of order 200 for a smart phone.

The electrodes can also be organized in rows and columns on the surface of the touchpad, like in the "mutual" measurement mode for coupling capacitances.

The purpose of the present invention is in particular to propose a touch and contactless control interface suited to operate in "self" mode which makes it possible to incorporate a fingerprint reader by using the same detection electronics in order in particular to minimize the costs, bulk and electric consumption.

The purpose of the present invention is also to propose such a device using only one detection electronics with a fingerprint reader for which the arrangement and position of the electrodes can be distinct and independent of the touchpad in order to allow a distinct optimization of the user interface (touchpad) and print sensor.

The purpose of the present invention is also to propose such a device which while using the same measurement channels is able to limit the cross talk and allow a robust distinction of events between the fingerprint sensor and the touchpad.

DESCRIPTION OF THE INVENTION

This objective is achieved with a human-machine interface device comprising:
- a touch surface provided with first capacitive measurement electrodes with a detection surface for detecting control objects;
- a fingerprint sensor provided with second capacitive measurement electrodes distinct from the first electrodes, with a detection surface for detecting fingerprints;
- capacitive electronic detection means arranged so as to allow the detection of control objects in a neighborhood of the first electrodes by measuring a capacitive coupling between said first measurement electrodes and said control objects;
- characterized in that said capacitive electronic detection means comprise inputs electrically connected simultaneously to at least one first measurement electrode and at least one second measurement electrode.

The detection surface of the first and second measurement electrodes corresponds respectively to the surface thereof on the side on which the one or more objects to be detected are located.

Depending on the embodiments, the one or more first measurement electrodes and the one or more second measurement electrodes connected to a single input of the detection means can be arranged in series along a connection track, and/or connected to this input by connection tracks which are at least in part distinct.

According to the embodiments, the device according to the invention can furthermore comprise:
- at least one first guard surface arranged near the first capacitive measurement electrodes according to a surface opposite to the detection surface thereof, and polarized to an electrical potential identical or substantially identical to the potential of at least one part of said first capacitive measurement electrodes; and/or
- at least one second guard surface arranged near the second capacitive measurement electrodes according to the surface opposite to the detection surface thereof, and polarized to an electric potential identical or substantially identical to the potential of at least one part of said second capacitive measurement electrodes.

The first and/or second guard surfaces can in that way be respectively polarized to an electric potential (referred to as "guard") sufficiently close to the electric potential of some electrodes that they protect (or substantially identical to this potential) in order to prevent the appearance of parasitic capacitances between these guard surfaces and the corresponding electrodes. In that way, these guard surfaces avoid or severely limit the appearance of parasitic capacitances between the measurement electrodes and the device under the one or more guard surfaces.

Depending on the implementation modes, the guard potential can be an alternating potential or ground.

Depending on the embodiments, the first and second guard surfaces may:
- be implemented in the form of a single, continuous guard surface which protects all of the electrodes and connection tracks;
- include openings.

Depending on the embodiments, the device according to the invention may furthermore comprise an upper guard surface arranged near the first capacitive measurement electrodes according to the detection surface thereof, and excited to an electrical potential identical or substantially identical to the potential of at least one part of said first capacitive measurement electrodes.

This upper guard surface may include openings across from the first measurement electrodes (so as to allow measurements), and cover over the touch surface between or around the first measurement electrodes, in particular across from the connection tracks towards the electronics. In particular, it also makes it possible to avoid disruption of the detection of control objects by capacitive coupling with the connection tracks.

Depending on the embodiments, the interface device according to the invention may comprise first measurement electrodes arranged in one of the following forms:
- in rows and columns; or
- in matrix pattern.

Depending on the embodiments, the interface device according to the invention may comprise second measurement electrodes arranged in a matrix form.

Depending upon the embodiments, the interface device according to the invention may comprise second measurement electrodes disposed along at least one measurement line, and arranged so as to allow the detection of fingerprints of a control object corresponding to a finger scrolling perpendicularly to said measurement line(s).

Depending on the embodiments, the interface device according to the invention may additionally comprise a guard surface polarized to an electric potential identical or substantially identical to the potential of at least one part of the second measurement electrodes, where the guard surface is disposed near said second electrodes according to the detection surface thereof and comprises an opening corresponding to the measurement line.

Depending on the embodiments, the interface device according to the invention may comprise capacitive electronic detection means arranged so as to allow the measurement of fingerprints by measurement of a capacitive coupling between the second measurement electrodes and a control object corresponding to a finger.

Depending on the embodiments, the interface device according to the invention can furthermore comprise at least one excitation electrode arranged along the capacitive coupling measurement line with the second measurement electrodes, and capacitive electronic detection means arranged so as to allow the measurement of fingerprints by measurement of the capacitive coupling disruptions between said at least one excitation electrode and said second measurement electrodes due to the presence of a control object corresponding to a finger.

Depending on the embodiments, the interface device according to the invention can furthermore comprise capacitive electronic detection means with switching means with which to configure them so as to measure with the same inputs either a capacitive coupling between the first measurement electrodes and at least one control object or else the disruption of the capacitive coupling between the at least one excitation electrode and the second measurement electrodes due to a control object.

Depending on the embodiments, the interface device according to the invention can comprise capacitive electronic detection means with an oscillator for exciting the first capacitive measurement electrodes to an alternating excitation potential at least during the measurement of capacitive coupling between the first measurement electrodes and one or more control objects.

Depending on the embodiments, the interface device according to the invention can comprise capacitive electronic detection means in part referenced to an alternating guard electric potential identical or substantially identical to the alternating excitation potential at least during the measurement of capacitive coupling between the first measurement electrodes and one or more control objects.

According to another aspect, an apparatus comprising an interface device according to the invention is proposed.

The apparatus according to the invention can comprise a touch surface with first measurement electrodes superposed on a display screen.

Depending on the embodiments, the device according to the invention can comprise a fingerprint sensor with second measurement electrodes disposed according to at least one layer located opposite the display screen relative to the first measurement electrodes.

In this case, the second electrodes of the fingerprint sensor can be superposed on those of the touchscreen (the first electrodes) and closer to the contact surface of this interface, which allows an optimal measurement configuration. It should also be noted that the second electrodes can then be superposed onto the display screen.

Depending on the embodiments, the device according to the invention can comprise a fingerprint sensor with second measurement electrodes disposed according to one or more same layer(s) as the first measurement electrodes.

Depending on the embodiments, the apparatus according to the invention may comprise a fingerprint sensor distinct from the display screen.

The fingerprint sensor can then in particular be arranged on the case of the device next to the screen or on a control button.

The device according to the invention can in particular be telephone, smart phone or tablet type.

DESCRIPTION OF THE FIGURES AND EMBODIMENTS

Other advantages and specificities the invention will appear to the reader from the detailed description of implementations and embodiments, which are in no way limiting, and from the following attached drawings:

FIG. 1(a) and FIG. 1(b) show respectively a first and second embodiment of the apparatus according to the invention.

It is well understood that the embodiments which will be described in the following are in no way limiting. One could in particular imagine variants of the invention only comprising a selection of features subsequently described isolated from other features described, if this selection of features is sufficient to confer a technical advantage or for distinguishing the invention from the state of the prior art. This selection includes at least one preferably functional feature without structural details, or with only a portion of the structural details, if this part alone is sufficient to give a technical advantage or to distinguish the invention compared to the state of the prior art.

In particular, all the variants and all the embodiments described can be combined with each other if nothing prevents it at the technical level.

In the figures, the elements common to several figures retain the same reference.

Figure 1:
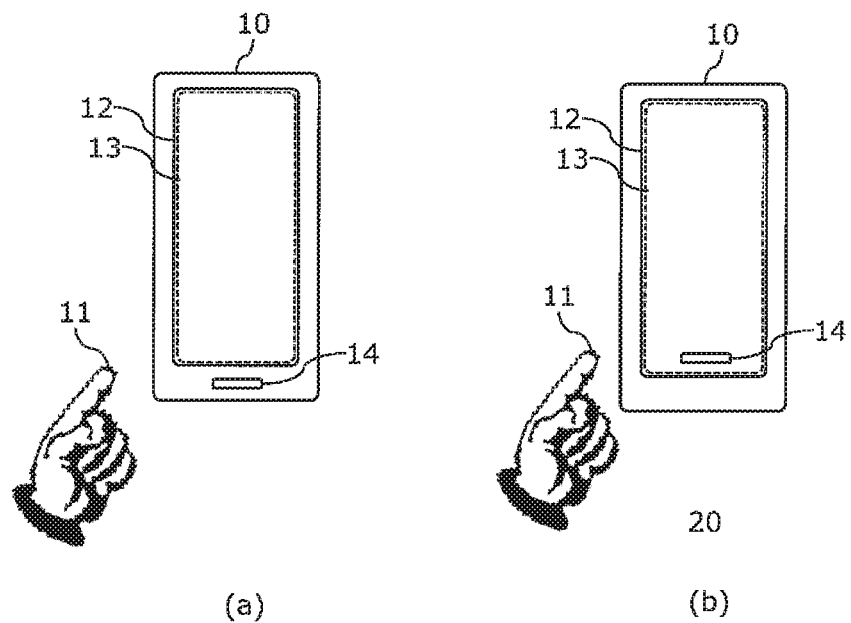

Referring to FIG. 1(a) and FIG. 1(b) the embodiments of the invention are going to be described in relation to a smart phone or tablet type apparatus.

Such an apparatus 10 usually comprises a display screen 12 with a surface or a touch interface 13 superposed. The assembly constitutes a user interface with which a user is able to control the apparatus 10 by means of one or more control object(s) 11 such as fingers.

The touch interface comprises substantially transparent capacitive electrodes. They are implemented with a substantially transparent conducting material, such as for example ITO (indium tin oxide) deposited on a dielectric material (e.g. glass or polymer). They are superposed on the display screen 13 which is, for example, TFT (thin-film transistor) or OLED (organic light-emitting diode) type.

The area in which the electrodes of the touch interface 13 can detect a control object 11 is defined as the touch interface 13 detection area.

The apparatus according to the invention additionally comprises a fingerprint reader 14 which can be used as an electronic lock for unlocking the apparatus 10 or for identifying the user on the basis of the fingerprints thereof for applications which require identification (instead of entering a password for example).

This fingerprint reader 14 is provided with capacitive measurement electrodes.

It can be located outside the display screen, as shown in FIG. 1(a). In particular, it can be on the body of the apparatus 14 or incorporated in a control button.

In this case, it could be implemented in the form of a printed circuit, which could be flexible, with electrodes deposited in the form of tracks or pads.

The fingerprint reader 14 can also be located on the display screen, as shown in FIG. 1(b).

In this case, the capacitive electrodes of the print reader 14 are implemented in a transparent material such as ITO.

They can be implemented in the same layers as the touch interface electrodes 13.

However, in a preferred embodiment, the capacitive electrodes for the print reader 14 are implemented in the form of layers located closer to the surface of the touch interface than the electrodes thereof. In fact, typically, the electrodes of the touch interface 13 are made in the form of layers located under a protective glass, or more precisely between the display screen 12 and this protective glass. It follows from this that they can be nearly a half millimeter from the surface which is acceptable considering their dimensions.

The capacitive electrodes of the print reader 14 can then be implemented on layers above the glass or towards the surface thereof. They are then separated from the surface by a thinner specific protective layer, of order several tens to several hundred microns thick for example. In that way, a better capacitive coupling with a finger 11 to be measured can be obtained and the lateral resolution of the measurement can be improved. In fact, the dimension of these electrodes is very small and in order to not degrade the spatial resolution the finger to electrode distance needs to be limited.

The area in which the electrodes of the print reader 14 can detect a finger 11 is defined as the print reader 14 detection area.

Figure 2:
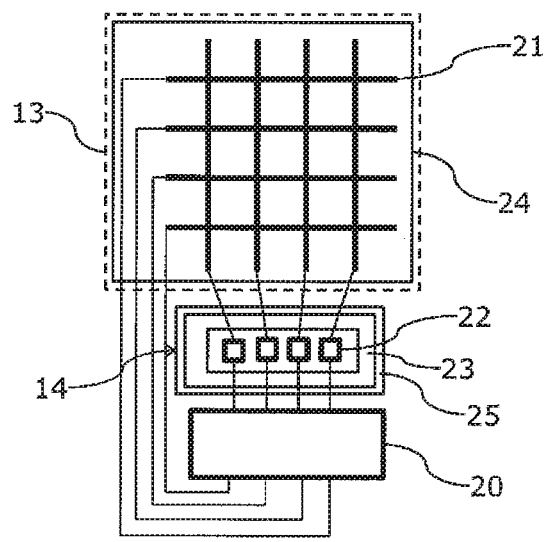
FIG. 2 shows a first embodiment of the interface device according to the invention.
Figure 3:
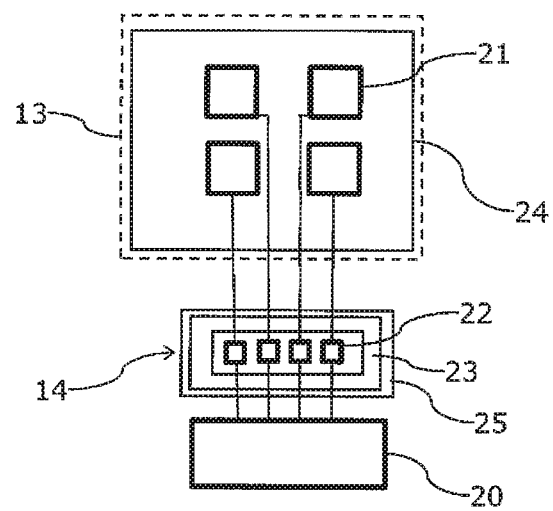
FIG. 3 shows a second embodiment of the interface device according to the invention.
Figure 4:
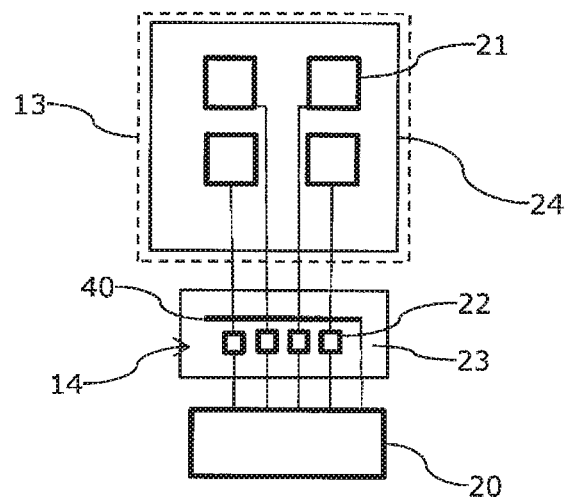
FIG. 4 shows a third embodiment of the interface device according to the invention.

Referring to FIG. 2, FIG. 3 and FIG. 4, we are now going to describe embodiments of the touch interface 13 with the fingerprint reader 14.

FIG. 2 shows an embodiment in which the touch interface 13 includes electrodes 21 arranged in rows and columns.

The print reader 14 comprises electrodes 22 arranged in a line, along the measurement line.

The interface furthermore comprises capacitive electronic detection means 20. This capacitive detection electronics 20 includes inputs connected to the electrodes 21 of the touch interface 13. At least some of these electrodes are also connected to the electrodes 22 of the fingerprint reader 14. In that way, it is possible to implement capacitive detection electronics 20 with a number of inputs close to the number of inputs necessary to control the device among the touch interface 13 and the fingerprint reader 14, which comprise the most electrodes (and in all cases a number of inputs less than the total number of electrodes of the touch interface 13 and the fingerprint reader altogether).

Of course, this capacitive detection electronics 20 may comprise additional inputs or inputs specifically dedicated to the print reader 14 or to the touch interface 13.

The representation from FIG. 2 (like FIG. 3 and FIG. 4) is purely schematic. In practice, the pitch of the rows and columns of electrodes 21 of the touch interface 13 is of order 4 to 5 mm, and the dimension of the print sensor electrodes 14 is of order 30 to 100 μm.

In this embodiment, the type of capacitive measurement in electrodes 21 of the touch interface 13 and in electrodes 22 of the print reader 14 is "self": the capacitive detection electronics 20 is laid out so as to measure the capacitance created between these electrodes 21, 22 and one or more fingers 11 (or other control objects) present nearby. The sensitivity thereof is in particular sufficient in order to detect remote control objects 11 in the neighborhood of the touch surface 13.

The capacitive detection electronics 20 is a priori not able to distinguish whether measurements are coming from capacitive coupling of a control object 11 with an electrode 21 of the touch interface or with the electrode 22 of the print sensor 14 connected to the same input.

In order to avoid confusion between the two measurement types, a solution consists of actuating the contactless control object 11 presence detection above the touch interface 13 only when the print sensor 14 is not used. In order to do that, the presence of a finger 11 on the print sensor 14 can be detected. This detection can be done for example by analyzing a form or signature of measurement signals coming from the electrodes. A finger scrolling on the electrodes 22 of the print sensor 14 does not generate the same signal shapes as a finger which hovers over or touches the touch interface 13. In fact, for example, the finger 11 on the print sensor 14 is capacitively coupled with all the electrodes 22 of the print sensor 14 whereas it does not generate coupling with some electrodes of the touch interface 13 (in the example from FIG. 1, the electrodes 21 in rows).

In order to make detection of a finger 11 on the print sensor 14 more robust, some electrodes (not shown) can for example be added to the print sensor 14 which are not connected to the electrodes 21 of the touch interface and which in that way are able to unambiguously detect the presence of a finger 11. These electrodes can also be used in order to detect the position and movement of the finger 11.

In the embodiment shown, the print sensor 14 furthermore comprises an upper guard surface 23 which is polarized to the electric potential of the electrodes 22. This upper guard surface 23 is preferably placed on the side of the electrodes 22 towards the detection area, therefore in a plane closer to the measurement surface (meaning the surface on which the finger 11 is placed) than the electrodes 22. It includes an opening opposite the electrodes 22 which defines a measurement line. This guard (whose operation is explained more precisely later) serves to eliminate leakage capacitances between the electrodes 22 and the environment. It also serves to restrict the measurement by limiting the sensitivity of the electrodes 22 of the print sensor 14 to objects 11 which are not directly facing or opposite these electrodes 22.

According to a variant of this embodiment, the capacitance measurement in the electrodes 21 of the touch interface 13 can be done in "mutual" mode. In this case, electrodes 21 in rows or columns are used as excitation electrodes and electrodes 21 according to the other direction are used as receiving electrodes.

The measurement in the electrodes 22 of the print reader 14 remains "self" type.

According to another variant of this embodiment, the capacitance measurement by the electrodes 21 of the touch interface 13 can be switched between "mutual" mode for detecting one or more objects in contact and "self" mode for detecting a single distant object.

The measurement in the electrodes 22 of the print reader 14 remains "self" type.

FIG. 3 shows an embodiment in which the touch interface 13 comprises electrodes 21 arranged in a matrix pattern. This pattern of the electrodes has the advantage in particular of allowing the unambiguous detection of several control objects 11, in contact and/or at a distance without contact.

The print reader 14 comprises electrodes 22 arranged in a line, according to the measurement line.

The interface furthermore comprises capacitive electronic detection means 20. This capacitive detection electronics 20 includes inputs connected to the touch interface 13 electrodes 21. Some of these inputs are also connected to the electrodes 22 of the print reader 14. In that way, it is possible to implement capacitive detection electronics 20 which only include a number of inputs close to the number of inputs necessary for the control of the touch interface 13 and which serves to simultaneously control the fingerprint reader 14.

It should additionally be noted that in practice, the number of electrodes 21 of the touch interface 13 is close to the number of electrodes 22 of the print reader 14 (for example of order 200 electrodes). In that way, the invention serves to reduce by roughly a factor of 2 the number of inputs necessary, or the number of integrated circuits necessary, for the capacitive detection electronics 20.

Of course, this capacitive detection electronics 20 may comprise additional inputs or inputs specifically dedicated to the print reader 14 or to the touch interface 13.

The capacitive measurement in electrodes 21 of the touch interface 13 and in electrodes 22 of the print reader 14 is "self" type: the capacitive detection electronics 20 is laid out so as to measure the capacitance created between these electrodes 21, 22 and one or more fingers 11 (or other control objects) present nearby. The sensitivity thereof is sufficient in order to detect remote control objects 11 in the neighborhood of the touch surface 13.

The capacitive detection electronics 20 is a priori not able to distinguish whether measurements are coming from capacitive coupling of a control object 11 with an electrode 21 of the touch interface or with the electrode 22 of the print sensor 14 connected to the same input.

In order to avoid confusion between the two measurement types, a solution consists of actuating the contactless control object 11 presence detection above the touch interface 13 only when the print sensor 14 is not used. In order to do that, the presence of a finger 11 on the print sensor 14 can be detected. This detection can be done for example by analyzing a form or signature of measurement signals coming from the electrodes. A finger scrolling on the electrodes 22 of the print sensor 14 does not generate the same signal shapes as a finger which hovers over or touches the touch interface 13. In fact, for example, the finger 11 on the print sensor 14 is capacitively coupled with all the electrodes 22 of the print sensor 14 whereas it does not generate coupling with some electrodes of the touch interface 13.

In order to make detection of a finger 11 on an print sensor 14 more robust, some electrodes (not shown) can for example be added to the print sensor 14 which are not connected to the electrodes 21 of the touch interface and which in that way are able to unambiguously detect the presence of a finger 11. These electrodes can also be used in order to detect the position and movement of the finger 11.

In this embodiment, it is preferable to not connect the electrodes 21 of the touch interface 13 which are located on the periphery of the screen 12 to the electrodes 22 of the print sensor 14. In fact, the electrodes 21 from the touch interface 13 placed on the periphery can add capacitance to the measurement when the apparatus is held in the hand (grip). This is due to edge effects and if the capacitances add to the capacitances to be measured with the finger 11 to be identified with the print sensor 14, then it could cause a poor identification of the print. The edge capacitances measured by the touch interface electrodes 13 can also be eliminated by using filters which would cancel these capacitances because they have a nearly static variation compared to the capacitances created by sliding the finger 11 to be identified on the print sensor 14 (entry is a static phenomenon whereas the print measurement generates a signal with a greater dynamic content).

Conversely, to the extent where the value of the capacitances measured by the print sensor 14 are very small, the detection of one or more contacts on the touch surface 13 is not affected by an accidental contact between a finger 11 and the print sensor 14.

As in the embodiment from FIG. 2, the print sensor 14 furthermore comprises an upper guard surface 23 which is polarized to the electric potential of the electrodes 22. This upper guard surface 23 is preferably placed on the side of the electrodes 22 towards the detection area, therefore in a plane closer to the measurement surface than the electrodes 22. It includes an opening opposite the electrodes 22 which defines a measurement line. This guard (whose operation is explained more precisely later) serves to eliminate leakage capacitances between the electrodes 22 and the environment. It also serves to restrict the measurement by limiting the sensitivity of the electrodes 22 of the print sensor 14 to objects 11 which are not directly facing or opposite these electrodes 22.

FIG. 4 shows an embodiment in which the touch interface 13 includes electrodes 21 arranged in a matrix pattern.

The print reader 14 comprises electrodes 22 arranged in a line, along the measurement line.

The interface furthermore comprises capacitive electronic detection means 20. The capacitive detection electronics 20 includes inputs connected to the electrodes 21 of the touch interface 13. Some of these inputs are also connected to the electrodes 22 of the print reader 14. In that way, it is possible to implement capacitive detection electronics 20 which only include a number of inputs close to the number of inputs necessary for the control of the touch interface 13 and which serves to simultaneously control the fingerprint reader 14.

It should additionally be noted that in practice, the number of electrodes 21 of the touch interface 13 is close to the number of electrodes 22 of the print reader 14 (for example of order 200 electrodes). In that way, the invention serves to reduce by roughly a factor of 2 the number of inputs necessary, or the number of integrated circuits necessary, for the capacitive detection electronics 20.

Of course, this capacitive detection electronics 20 may comprise additional inputs or inputs specifically dedicated to the print reader 14 or to the touch interface 13.

As with the embodiment from FIG. 3, the capacitive measurement in electrodes 21 of the touch interface 13 is "self" type: the capacitive detection electronics 20 is laid out so as to measure the capacitance created between these electrodes 21 and one or more fingers 11 (or other control objects) present nearby. The sensitivity thereof is sufficient in order to detect remote control objects 11 in the neighborhood of the touch surface 13.

In this embodiment, the print reader 14 operates in "mutual" mode. It comprises an excitation electrode 40 located in the area of the measurement electrodes 22. The advantage of this operation in "mutual" mode with the excitation electrode 40 is in particular to allow activation and deactivation of the operation of the print sensor 14.

When a finger 11 is placed on the print sensor 14 for identification, the electronics 20 activate the excitation electrode 40 and process the measurement of the capacitances detected by the electrodes 22 taking as reference the signal which excites the excitation electrode 40. Advantageously, since this excitation signal is not present on the touch interface 13, the print sensor 14 cannot detect a capacitance variation near this touch interface 13 even if fingers 11 or objects are above or in contact with the sensitive surface of the touch interface.

With this embodiment, the measurement ambiguities between the touch interface 13 and the print sensor can thus be avoided. Additionally, the use of the excitation electrode 40 allows the spatial confinement of the measurement area because only the disturbances of the coupling between this excitation electrode 40 and the measurement electrodes 22 are measured.

In the embodiment shown, the excitation electrode 40 is placed on the side of the electrodes 22 towards the detection area. It can thus be implemented in a plane closer to the measurement surface than the electrodes 22.

Preferably, as in the previous embodiments, the print sensor 14 furthermore comprises an upper guard surface 23 (not shown in FIG. 4) placed on the side of the electrodes 22 towards the detection area, therefore in a plane closer to the measurement surface than the electrodes 22. This upper guard surface 23 comprises an opening opposite the electrodes 22 and the excitation electrode 40 which allows the interactions necessary for the measurements. It should be noted that this upper guard surface 23 is not indispensable, because the confinement of the measurement is done by the interaction area between the excitation electrode 40 and the measurement electrodes 22. It however serves to limit the parasitic couplings and improve the overall measurement precision.

The excitation electrode 40 can be implemented in the same plane or on the same layer as the upper guard 23. Additionally, when the touch interface 13 is used, this excitation electrode 40 can be connected to the upper guard potential 23 and in that way contribute to the protection against parasitic coupling.

In the embodiment shown in connection with FIG. 2, FIG. 3 and FIG. 4, guard elements in guard electrode or guard plane form are positioned respectively according to the back surface of the measurement electrodes 21 of the touch interface 13 and of the measurement electrodes 22 of the print sensor 14, relative to the detection areas of the control objects 11. The function of these guard elements is to avoid parasitic electrical coupling between the measurement electrodes 21, 22 and the environment thereof.

In order to do that, these guard elements are excited or polarized to an electrical potential substantially identical to the potential of the measurement electrodes that they are protecting (or to at least one electrical potential substantially identical to the potential of some of them).

It should be noted that the embodiments shown in connection with FIG. 2, FIG. 3 and FIG. 4 can also be implemented without these guard elements, but in that case it results in poorer performance.

More specifically, the touch interface 13 comprises an interface guard surface 24 implemented with a layer of substantially transparent conducting material, such as ITO (indium-tin oxide) for example. This guard interface 24 is separated from the measurement electrodes 21 by a layer of dielectric material.

The print reader 14 also comprises a reader guard surface 25 disposed along the surface of the electrodes 22 opposite the detection area, therefore between the electrodes 22 and the remainder of the apparatus 10.

According to a variant, applicable in particular to the embodiments from FIG. 3 and FIG. 4, a touch interface 13 can furthermore comprise an upper interface guard surface (not shown) placed on the side of the electrodes 21 towards the detection area. This upper interface guard surface has openings opposite electrodes 21 to allow the measurements and is arranged so as to protect the areas around these electrodes 21 and in particular those comprising connection tracks.

In the embodiment shown, the interface guard surface 24 and the reader guard surface 25 are polarized to the same potential. They can be electrically connected or even be part of a single guard plane. Preferably, they extend respectively under the connection tracks between the electrodes 21 of the touch interface 13 and the electrodes 22 of the print reader 14 as much as possible in order to protect these tracks.

Similarly, the upper guard surface 23 and the lower interface guard surface (when they are present obviously) are polarized to the same potential as the interface guard surface 24 and the reader guard surface 25. Preferably, they extend respectively over the connection tracks between the electrodes 21 of the touch interface 13 and the electrodes 22 of the print reader 14 as much as possible in order to protect these tracks.

Figure 5:
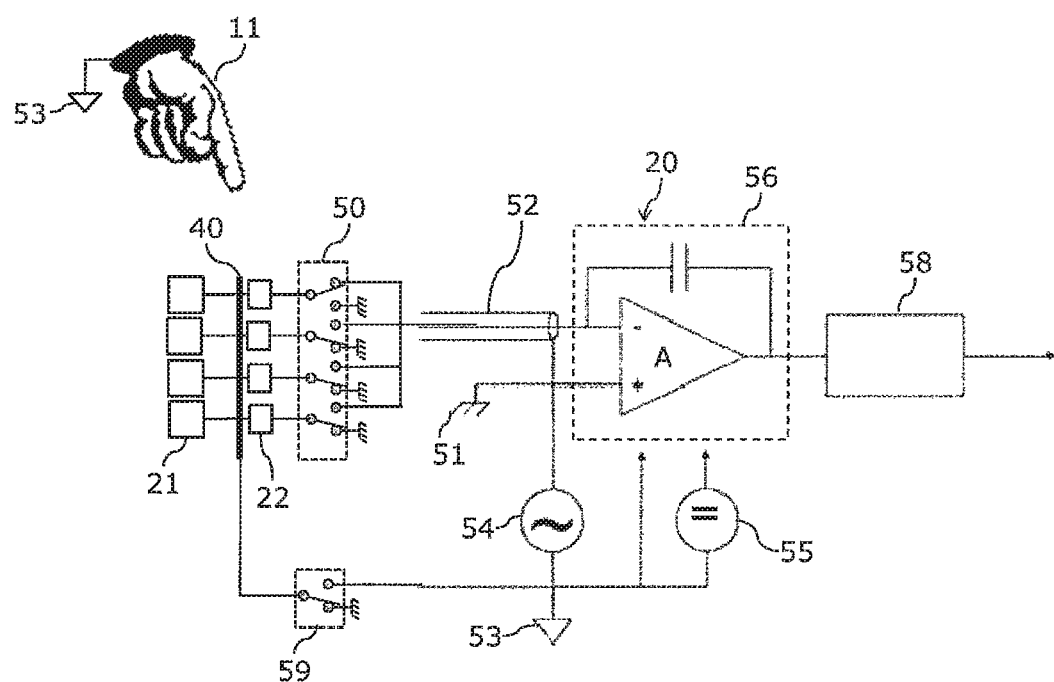
FIG. 5 shows an embodiment of detection electronics according to the invention.

With reference to FIG. 5, we are now going to describe an embodiment of capacitive electronic detection means 20.

This embodiment of the electronics is more specifically suited to the implementation of the interface device according to the embodiment described in relation to FIG. 4.

This electronics includes a mode switcher 59 with which to configure the electronics in two different ways in order to respectively measure:

Capacitance between the measurement electrodes 21 of the touch interface 13 and one or more control objects 11 in "self" mode;

Coupling capacitance between the excitation electrode 40 and at least one measurement electrode 22 of the print sensor 14 in "mutual" mode.

The configuration shown in FIG. 5 corresponds to the configuration for measuring capacitance between the measurement electrodes 21 of the touch interface 13 and one or more control objects 11 in "self" mode. In this configuration, the electronic capacitive detection means 20 are configured so as to implement a floating bridge capacitive measurement system such as described for example in the Roziere patent FR 2 756 048.

The detection circuit comprises a part referred to as floating 56 whose reference potential 51, called guard potential 51, oscillates relative to the overall system ground 53, which can be actual ground. The alternating potential difference between the guard potential 51 and the ground 53 is generated by an excitation source, or an oscillator 54 and the mode switcher 59.

This mode switcher 59 (which is an electrical switch) is disposed so as to connect the guard 51 either to the oscillator 54 or to the ground 53. In the configuration from FIG. 5, it is therefore positioned so as to connect the oscillator 54 to the guard 51.

The guard elements previously described (in particular including the upper guard surface 23 and the reader guard surface 25 of the print sensor 14, and also the upper interface guard surface and the interface guard surface 24 of the touch interface 13) are connected to the guard potential 51.

In this configuration, the excitation electrode 40 which is connected to the output of the oscillator 54 is therefore connected to the guard potential 51 and contributes to the guard.

The floating part 56 includes the sensitive part of the capacitive detection, which is shown in FIG. 5 by a charge amplifier. It can of course include other means of processing and conditioning the signal, including digital or microprocessor-based, also referenced to the guard potential 51. These means of processing and conditioning serve for example to calculate distance and contact information from capacitance measurements.

The electric supply of the floating portion 56 is provided by floating means of supply transfer 55, comprising for example DC/DC converters.

This capacitive detection electronics 20 in that way serves to measure information about capacitance between at least one measurement electrode 21 of the touch interface 13 and a control object 11 ("self" mode).

The control object 11 must be connected to a potential different from the guard potential 51, such as for example the ground potential 53. This configuration is in fact present when the control object 11 is a finger of a user whose body defines a ground or an object (such as a stylus) handled by this user.

In a second configuration, the capacitive detection electronics 20 serves to measure information on coupling capacitance between the excitation electrode 40 and at least one measurement electrode 22 of the print sensor 14 in "mutual" mode.

In this configuration, the mode switcher 59 is positioned so as to connect the guard potential 51 to the ground potential 53. In other words, the guard potential 51 corresponds to the ground potential 53 and all electronics, including the sensitive part for capacitive detection shown in FIG. 5 by a charge amplifier, are referenced to the ground potential 53.

The excitation electrode 40 is always connected to the output of the oscillator 54. It is therefore polarized to the alternating excitation potential of this oscillator 54.

In this case, a capacitive coupling is established between this excitation electrode 40 and the measurement electrodes 22, which is measured by the detection electronics. The presence of a finger 11 near to the ground potential 53, for example, changes this capacitive coupling, which makes it possible to obtain a measurement.

It should be noted that when the capacitive detection electronics 20 is configured in "mutual" mode in order to measure coupling capacitances near the print reader 14, the measurement electrodes 21 of the touch interface 13 are at ground 53. In this case, the system is practically insensitive to the presence of a control object 11 also at ground 53 near the touch interface. Conversely, when the capacitive detection electronics 20 is configured in "self" mode in order to measure capacitances between a control object 11 and the measurement electrodes 21 of the touch interface 13, the excitation electrode 40 is at the guard potential 51 and contributes to strongly limiting the influence of a finger 11 which might be set on the print reader 14. In that way, the touch interface 13 and the print reader 14 can be controlled by the same electronics 20 with a minimum of mutual disruption or cross talk.

The capacitive detection electronics 20 also includes switchers or analog switches 50 driven by electronic control means which serve to select a set of measurement electrodes 21, 22 connected to each other and to connect them to the detection electronics 20 in order to measure the coupling capacitance thereof with the control object 10 and/or the excitation electrode 40 as previously explained. These switches 50 are configured in such a way that a set of measurement electrodes 21, 22 connected to each other is connected either to the capacitive detection electronics 20 or to the guard potential 51.

The detection sensitive part is protected by a guard shielding 52 connected to the guard potential 51.

In that way, measurement electrodes 21, 22 connected by a switch 50 to the capacitive detection electronics 20 are surrounded by guard planes made up at least in part by inactive measurement electrodes 21, 22 and by guard elements connected to the guard potential 51.

Since the active measurement electrodes 21, 22 are also at guard potential 51, the appearance of parasitic capacitances between these electrodes and their environment is in that way avoided such that only coupling with the object of interest 11 (and/or with the excitation electrode 40) is measured with a maximum sensitivity.

The floating electronics 56 is connected at the output to the apparatus 58 electronics referenced to ground by electrical connection elements compatible with the difference in reference potentials. These elements can include for example differential amplifiers or optical couplers.

Of course, as previously explained, in "mutual" mode the guard potential 51 corresponds to the ground potential 53.

In that way, the switches 50 serve to sequentially poll or interrogate the measurement electrodes 21 of the touch interface 13 and also the measurement electrodes 22 of the print sensor 14.

Of course, several routes for capacitive detection electronics 20 can be implemented in parallel, each controlling a subset of electrodes 21, 22.

The fingerprint sensor 14 from the invention provides a measurement signal which is similar to that provided by other known sensors which implement similar electrode 22 geometries. Thus, this measurement signal can be processed in the apparatus by applying known algorithms in order to identify or verify measured fingerprints.

As previously explained, the embodiment described with reference to FIG. 5 is more specifically suited to use with the embodiment of the interface from FIG. 4.

In order to implement the capacitive detection electronics 20 with the interface embodiments in FIG. 2 and FIG. 3 in "self" mode, the excitation electrode 40 and the switch 59 can be omitted. In this case, the capacitive detection electronics 20 serve to measure information about capacitance between a measurement electrode 21 of the touch interface 13 and an electrode 22 of the print sensor 14 connected to the same input and a control object 11 present in front of one of the electrodes ("self" mode).

In order to implement the capacitive detection electronics 20 for the touch interface with the interface embodiments in FIG. 2 in "mutual" mode, the excitation electrode 40 can be omitted. In their place, switches (or direct connections) can be provided which serve to connect electrodes 21 to the oscillator 54 according to rows or columns. In that way, the capacitive detection electronics 20 can be implemented in "self" or "mutual" mode as previously described by changing the position of the switch 59.

Of course, the invention is not limited to the examples which were just described and many arrangements could be made to these examples without leaving the scope of the invention.

The invention claimed is:

1. A human-machine interface device, comprising:
a touch surface provided with first capacitive measurement electrodes with a detection surface for detecting control objects;
a fingerprint sensor provided with second capacitive measurement electrodes distinct from the first capacitive measurement electrodes, with a detection surface for detecting fingerprints, wherein the fingerprint sensor and the touch surface are coupled to form a plurality of electrode pairs, each electrode pair including one first capacitive measurement electrode in the touch surface directly electrically connected to a second capacitive measurement electrode in the fingerprint sensor; and
capacitive detection electronics arranged so as to allow the detection of control objects in a neighborhood of the first capacitive measurement electrodes by measuring a capacitive coupling between said first capacitive measurement electrodes and said control objects;
wherein the capacitive detection electronics comprise a plurality of amplifier circuits, each amplifier circuit electrically connected simultaneously to the first capacitive measurement electrode and the second capacitive measurement electrode in one of the electrode pairs; and
wherein at least one of the first capacitive measurement electrodes and the second capacitive measurement electrodes is configured for self capacitance sensing.

2. The interface device according to claim 1, further comprising one or both of:
- at least one first guard surface arranged near the first capacitive measurement electrodes according to a surface opposite to the detection surface thereof, and polarized to an electrical potential referenced to the potential of at least one part of said first capacitive measurement electrodes; and
- at least one second guard surface arranged near the second capacitive measurement electrodes at least according to the surface opposite to the detection surface thereof, and polarized to an electric potential referenced to the potential of at least one part of said second capacitive measurement electrodes.

3. The interface device according to claim 1, comprising the first capacitive measurement electrodes arranged in one of the following forms:
- in rows and columns; or
- in matrix pattern.

4. The interface device according to claim 1, comprising second capacitive measurement electrodes arranged in a matrix pattern.

5. The interface device according to claim 1, wherein the second capacitive measurement electrodes are disposed according to at least one measurement line, and arranged so as to allow the detection of fingerprints of a finger scrolling perpendicularly to said at least one measurement line.

6. The interface device according to claim 5, further comprising a guard surface polarized to an electric potential referenced to the potential of at least one part of the second capacitive measurement electrodes, where the guard surface is disposed near said second capacitive measurement electrodes according to the detection surface thereof and comprises an opening corresponding to the measurement line.

7. The interface device according to claim 1, wherein the capacitive detection electronics are arranged so as to allow the measurement of fingerprints by measurement of a capacitive coupling between the second capacitive measurement electrodes and a finger.

8. The interface device according to claim 5, further comprising at least one excitation electrode arranged according to the measurement line near the second capacitive measurement electrodes, wherein the capacitive detection electronics are arranged so as to allow the measurement of fingerprints by measurement of the capacitive coupling disruptions between said at least one excitation electrode and said second capacitive measurement electrodes due to the presence of a finger.

9. The interface device according to claim 8, the capacitive detection electronics including switching means with which to configure the capacitive detection electronics so as to measure with the same sense amplifier either a capacitive coupling between the first capacitive measurement electrodes and at least one control object or the disruption of the capacitive coupling between the at least one excitation electrode and the second capacitive measurement electrodes due to a control object.

10. The interface device according to claim 1, the capacitive detection electronics including an oscillator for exciting the first capacitive measurement electrodes to an alternating excitation potential at least during the measurement of capacitive coupling between the first capacitive measurement electrodes and one or more control objects.

11. The interface device according to claim 10, the capacitive detection electronics in part referenced to an alternating guard electric potential referenced to the alternating excitation potential at least during the measurement of capacitive coupling between the first capacitive measurement electrodes and one or more control objects.

12. An apparatus comprising an interface device according to claim 1.

13. The apparatus according to claim 12, comprising a touch surface with the first capacitive measurement electrodes superposed on a display screen.

14. The apparatus according to claim 13, wherein the second measurement electrodes are disposed according to at least one layer located opposite the display screen relative to the first capacitive measurement electrodes.

15. The apparatus according to claim 13, wherein the fingerprint sensor is distinct from the display screen.

16. The apparatus according to claim 12, which is telephone, smart phone or tablet type.

17. A method for detecting control objects and fingerprints in a human-machine interface device, comprising:
- directly electrically connecting a first capacitive measurement electrode from a plurality of capacitive touch electrodes on a touch surface and a second capacitive measurement electrode from a plurality of capacitive fingerprint electrodes on a fingerprint sensor to form an electrode pair;
- simultaneously electrically connecting the first capacitive measurement electrode and the second capacitive measurement electrode in the electrode pair to a single amplifier circuit of capacitive detection electronics;
- when no control object is detected at the fingerprint sensor, actuating use of the plurality of capacitive touch electrodes on the touch surface to detect a control object; and
- when a control object is detected at the fingerprint sensor, determining a fingerprint from the plurality of capacitive fingerprint electrodes;
- wherein at least one of the first capacitive measurement electrode and the second capacitive measurement electrode is configured for self capacitance sensing.

18. The method of claim 17, further comprising detecting the control object at the fingerprint sensor by analyzing a signature of measurement signals from the plurality of capacitive touch electrodes on the touch surface and the plurality of capacitive fingerprint electrodes on the fingerprint sensor.

19. The method of claim 18, wherein analyzing the signature of measurement signals comprises determining that the measurement signals from all of the plurality of capacitive fingerprint sensors indicate a presence of the control object while the measurement signals from some of the plurality of capacitive touch electrodes do not indicate the presence of the control object.

\* \* \* \* \*